(12) United States Patent
Jacob

(10) Patent No.: US 6,425,668 B1
(45) Date of Patent: Jul. 30, 2002

(54) TENTED ART PROJECTOR

(76) Inventor: Dan Jacob, 48370 Sawleaf St., Fremont, CA (US) 94539

( * ) Notice: Subject to any disclaimer, the term of this patent is extended or adjusted under 35 U.S.C. 154(b) by 35 days.

(21) Appl. No.: 09/637,153

(22) Filed: Aug. 14, 2000

(51) Int. Cl.[7] .............................................. G03B 21/14
(52) U.S. Cl. ............................ 353/119; 353/62; 353/79
(58) Field of Search .................... 353/22, 24, 43, 353/62, 79, 80.87, 97, 119

(56) References Cited

U.S. PATENT DOCUMENTS

| | | | |
|---|---|---|---|
| 1,972,123 A | | 9/1934 | Zimmerman |
| 1,992,776 A | | 2/1935 | Schindler |
| 2,048,365 A | | 7/1936 | Agate et al. |
| 2,678,583 A | * | 5/1954 | Knapik .......................... 353/24 |
| 3,401,596 A | | 9/1968 | Hirsch |
| 3,749,485 A | * | 7/1973 | Carter et al. ................... 353/62 |
| 4,756,615 A | * | 7/1988 | Hildebrand ................... 353/74 |
| 5,080,480 A | * | 1/1992 | Weiss ........................... 353/12 |
| 6,206,524 B1 | * | 3/2001 | Jacob ........................... 353/43 |

* cited by examiner

Primary Examiner—William Dowling

(57) ABSTRACT

A projection apparatus for the enlargement of photos and sketches constructed integrally within a small tent so that it may be used without requiring a darkened room for projecting. The tent is placed upon a suitable table and has an opening on one side for accessing its interior. The projection system requires that the photo or sketch be traced onto a clear plastic sheet which is then placed onto a transparent platform located somewhere between a miniature lamp and the projection surface. When the lamp is turned on, an enlarged shadow of the traced image is seen on the projection surface and is then traced onto it. Varying the projected enlargement is achieved buy sliding the lamp holder up and down a linear slide.

13 Claims, 3 Drawing Sheets

TENTED ART PROJECTOR

BACKGROUND OF THE INVENTION

The present invention relates to lensless image projectors, and in particular to art projectors used by artists to enlarge sketches and reference photos.

Most image projectors require a darkened room for their use. Those projectors include movie projectors, slide projectors (for transparencies), opaque projectors (for photos), and LCD projectors (for computer images). Overhead projectors work well in partially lighted rooms by employing very large projection lenses.

Many painters use art projectors to enlarge sketches or photos onto their work surfaces (canvas, watercolor paper, etc.). Those art projectors, also called opaque projectors, require a darkened room in order to achieve a clear and sufficiently contrasted projected image. The requirement of a darkened room severely inconveniences the use of art projectors. When working during the daytime, one must either shade all the room windows with opaque material, or have access to a room without windows. If they cannot darken a room during the day, then they must enlarge their images after dusk.

Another limiting characteristic of art projectors is that the larger the desired magnification of the original, the larger must be the distance from the projector to the projection surface. So even if the artist has access to a small room without windows, they will not be able to achieve large image magnifications in such a small room.

A further limiting characteristic of current art projectors is that they operate with high voltage (household voltage) and utilize high-powered bulbs making them unsafe for use by kids under about twelve years of age without supervision.

DISCUSSION RELATING TO PRIOR ART

Since the present invention employs a projection system based on the principle of the shadowgraph, it seems appropriate to bring forth some examples of prior art related to shadowgraph projectors.

A shadowgraph is essentially a shadow of an object obstructing light that emanates from a point light source. The shadow will be a sharp image of the object's contour. The object obstructing the light may be a dark line drawn on a transparent sheet. Such a dark line will also produce a sharp shadow of itself when illuminated by a point source of light. In reality it is not possible to create a perfect point light source, but a close approximation may be had from a miniature lamp such as a flashlight lamp having a very small filament.

Examples of projection devices utilizing the shadowgraph principle are U.S. Pat. Nos. 1,972,123, 1,992,776, 2,048,365, and 3,401,596.

What is common to all the above-mentioned inventions is that they all require a darkened environment in order to see a clear projected image. And, as has been mentioned above, the requirement of a darkened environment is a limitation of most projection devices seen today.

OBJECTS OF THE INVENTION

Accordingly, it is an object of the present invention to provide an image enlargement apparatus that does not require a darkened environment for its use.

Another object of the invention is to provide an image enlargement apparatus that does not require an increasingly larger space for increasingly larger magnifications.

It is a further object of the present invention to provide a battery operated, low power projection apparatus that is independent of electrical wall outlets and is quite safe for kids to use.

SUMMARY OF THE INVENTION

These and other objects are achieved by the present invention that provides a lensless, battery operated image projection apparatus that is enclosed within a collapsible, darkened enclosure.

The projection system consists of a point light source in the form of a flashlight lamp, a transparency platform located under the lamp, and the projection surface located under the platform. The artist's working surface is placed on the projection surface and, in effect, becomes the projection screen.

To enlarge an image such as a photo, first a transparency is made by tracing the original image onto a clear sheet of plastic. The transparency is placed onto the transparency platform. When the lamp is turned on in a darkened environment, an enlarged shadow of the transparency is seen on the projection surface below. The enlarged shadow is then traced onto the artist's working surface.

The projection system and projection surface described above are enclosed inside a pyramid-shaped tent that provides a darkened enclosure for projection in a lighted environment.

A more complete understanding of the present invention and other objects, aspects and advantages thereof will be gained from a consideration of the following description of the preferred embodiments read in conjunction with the accompanying drawings provided.

BRIEF DESCRIPTION OF THE PREFERRED EMBODIMENT

Figure 1:
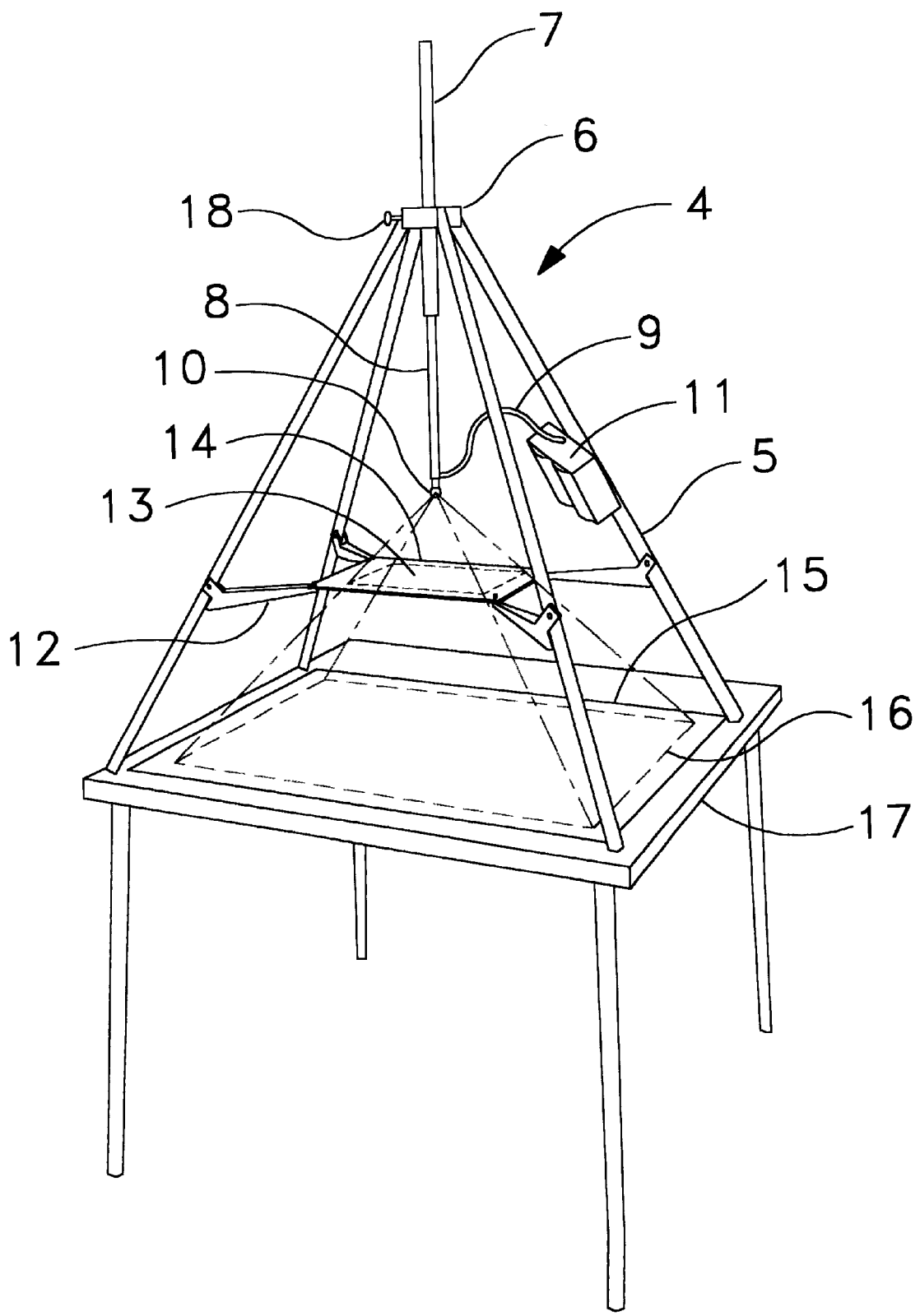
FIG. 1 is a perspective view of the projection system and tent frame placed on a table.

While the present invention is open to various modifications and alternative constructions, the preferred embodiment shown in the drawings will be described herein in detail. It is to be understood, however, there is no intention to limit the invention to the particular form disclosed. On the contrary, it is intended that the invention cover all modifications, equivalences and alternative constructions falling within the spirit and scope of the invention as expressed in the appended claims.

Where used herein, the word "attached" means that the two parts referred to are either fabricated as a single piece, glued together, screwed or bolted together, or joined together by a pivotable pin. However, other forms of attachment may be suitable, consistent with simplicity of manufacture and reliability of operation.

Referring to FIG. 1, tent frame 4 includes hub 6 to which legs 5 are pivotally attached.

Attached to frame 4 is an image projection system including light source 10 and transparent platform 14 and battery pack 11.

Light source 10 is attached to rod 8. Light source 10 is a flashlight lamp powered by battery pack 11 through electrical cable 9. Battery pack 11 is attached to one of legs 5.

Rod 8 is slidably attached to tube 7 and maintains its vertical position by virtue of a predetermined frictional force between the rod and tube.

Tube 7 is slidably attached to the center of hub 6 in such a way as to allow it to be vertically positionable and held in place with tightening screw 18.

Figure 3:
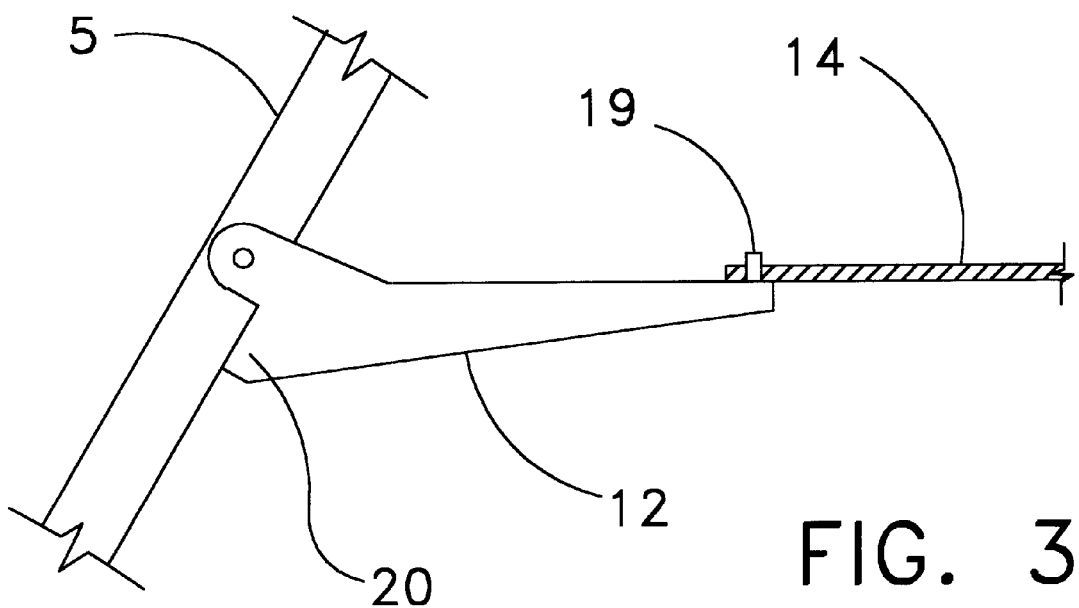
FIG. 3 is a cross-sectional view of one of the arms supporting the transparent platform.

Transparent platform 14 is supported by arms 12 and is prevented from moving horizontally by pins 19 shown in FIG. 3. Pins 19 are attached to arms 12 and are removably linked into matching holes in platform 14.

Arms 12 are pivotally attached to legs 5 of frame 4 and are designed to maintain a generally horizontal position when lowered. They are stopped at this horizontal position by protrusions 20 seen in FIG. 3.

Figure 2:
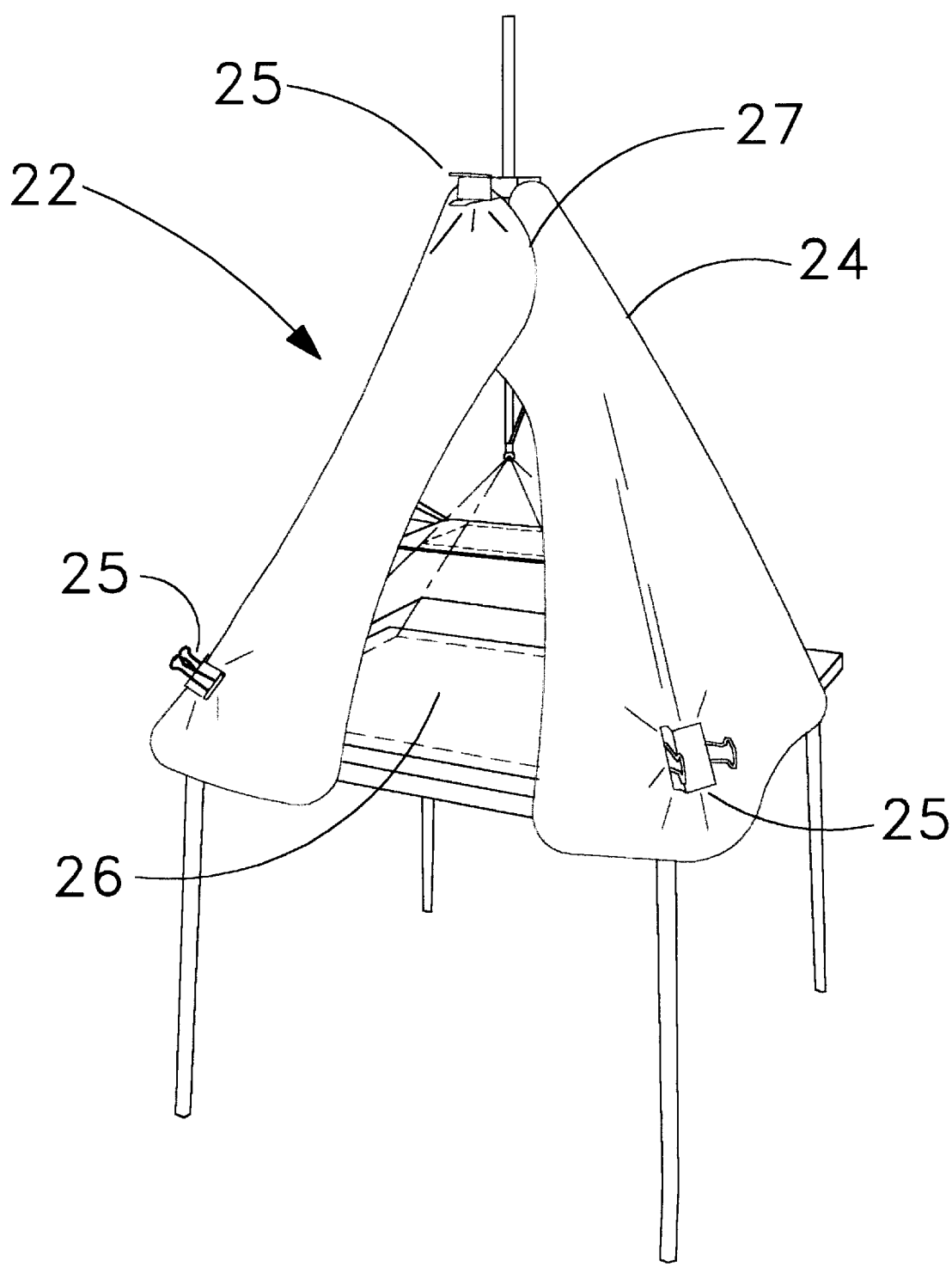
FIG. 2 is a perspective view of the projection system and tent placed on a table.

Referring now to FIG. 2, opaque fabric or plastic material 24 is draped over frame 4 to form tent 22 around the projection system. Clips 25 secure material 24 to the frame.

DETAILED DESCRIPTION OF THE PREFERRED EMBODIMENT

Figure 4:
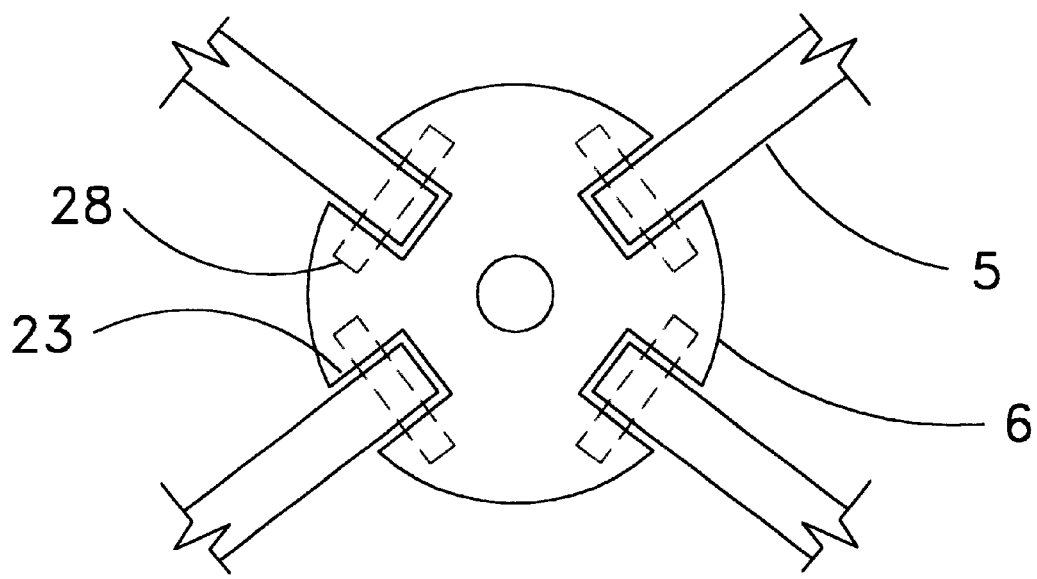
FIG. 4 is a partial top view of the four legs pivotally attached to the hub.

Frame 4 consisting of legs 5 and hub 6 forms a supporting structure for tent 22 shown in FIG. 2. A partial top view of hub 6 and legs 5 is shown in FIG. 4. Slots 23 in hub 6 are so spaced as to cause the lower tips of legs 5 to form a rectangle of predetermined proportions when spread apart by pivoting around pins 28.

Platform 14 is constructed out of a clear sheet of plastic such as acrylic of about ⅛" thick. There are four holes adjacent to each corner of the platform, and these holes fit around pins 19 in each of arms 12. The size of platform 14 should be about the size of an "A" size sheet, i.e. 8.5" by 11". This platform size is able to accommodate transparencies the size of a magazine cover.

In other embodiments of the present invention arms 12 could be eliminated by making platform 14 large enough to hook onto legs 5 directly. Variations of this sort are matters of economics rather than innovation.

Platform 14 and arms 12, when linked, prevent legs 5 from moving inwards and outwards so that the base of tent 22 is fixed in size. The base size of tent 22 in the preferred embodiment of the present invention is slightly larger than the size of a full sheet of watercolor paper 15 that is 22" by 30".

In the preferred embodiment of the invention legs 5 and tube 7 are made of ½" (nominal) diameter plastic tubing. Rod 8 is made from a ½" diameter hardwood dowel.

Variable enlargement of the projected image 16 is achieved by moving rod 8 up and down. The closer lamp 10 is to platform 14, the larger will the enlargement be, and vice versa. In order to obtain a small enlargement, rod 8 and lamp 10 should be as high into tube 7 as possible. The geometric formula that governs the magnification is:

Magnification=Distance from table to lamp/Distance from platform to lamp

Hence, if the distance from table to lamp is 36" and the distance from platform to lamp is 24", then the magnification is 36/24=1.5

It isn't practical to design the projection system for achieving magnifications of less than 1.5 considering that, in order to achieve a magnification of 1.0 the lamp would have to be at infinity! In the existing model of the present invention the distance from hub 6 to the table is about 32" and the distance from platform 14 to the table is 11". The lengths of tube 7 and rod 8 are 15" each. Cable 10 is given enough slack to allow lamp 10 to get as close as about 1" from platform 14. With the dimensions given, the smallest magnification achievable is about 1.75.

From the above magnification formula it can be seen that, in order to achieve large magnifications, lamp 10 is brought closer to platform 14, making the projection system, in effect, smaller. This is the precise reason that this lensless type of projection system was chosen for use in the present invention. Art projectors that employ lenses require larger and larger distances between projector and screen for larger magnifications, precisely the opposite situation as that of a lensless projector. Hence it would not at all be obvious to one skilled in the art of projectors and wanting to enclose an art projector into an integral, darkened enclosure, that the solution to the problem would be to employ a more primitive form of projection device for this purpose.

Lamp 10 is attached to rod 8 by means of a lamp socket that is screwed on to rod 8. There is no need for a switch, since the lamp itself acts as a switch by simply unscrewing it until the light turns off. Of course, in other embodiments a separate lamp switch may be preferred.

Battery pack 11 holds two "D" size batteries that can power the lamp for at least ten hours. Considering the fact that a typical enlarging session takes around fifteen minutes, the batteries should last for about forty sessions. If independence from line voltages is not a factor in a particular design, a step-down transformer could also be used to supply lamp power.

Tube 7 is positionable through the center of hub 6. Screw 18 through the side of hub 6 secures tube 7 at a desired height. For lower magnifications tube 7 is positioned as high as possible so that lamp 10 may be positioned as far from platform 14 as possible. When the tent structure is collapsed for storage, tube 7 may be lowered until its top is flush with hub 6 for compactness.

Rod 8 slides up and down tube 7 with a predetermined friction. In the present embodiment this friction is achieved by wrapping and gluing a thin sheet of felt around the top three inches of rod 8. This thin sheet of felt just fills the gap between the outside diameter of rod 8 and the inside diameter of tube 7.

The device used to raise and lower lamp 10 is not limited to the tube and plunger type described herein. Other applicable devices may be used such as scissor extenders, ball bearing slides, or bellows extenders.

To set up the tented projector, first frame 4 is placed on a suitable table 17 with hub 6 pointing upwards. Legs 5 are spread apart to the approximate final dimensions of the base. Then arms 12 are lowered and platform 14 is placed on the arms engaging pins 19. When platform 14 and arms 12 are engaged, the base dimensions of the frame are set.

Next, referring to FIG. 2, tent skin 24 is draped onto frame 4. Clips 25 secure the tent skin to the frame. The tent skin should be made out of an opaque fabric or plastic material. Complete darkness is not necessary; in fact, it's not desirable. The reason for this is that when the user traces the projected shadow lines onto the work surface, they must be able to distinguish between the shadow lines and the lines that they have penciled in. In complete darkness they wouldn't be able to see the difference.

The tent has an opening 26 in front for access to the interior of the tent. When a person sits in front of the tent and is bent slightly forwards as they work on their enlargement, their body and head will block most of the ambient light from getting into the tent through opening 26.

In another embodiment of the present invention one might substitute a hollow, bottomless pyramid instead of a frame and skin structure to form a tent integral with the projection system. The result, however, would be the same as far as the operational aspects of the projection apparatus are concerned. The choice would simply be a matter of manufacturing costs and what level of compactness one desires to achieve for the final, shippable product.

When the tented projector is not in use it can be compactly folded and stored away. To do this, platform 14 is removed, arms 12 are folded upwards to fit snugly against legs 5, and the legs along with the attached tent material are brought together in close contact. Tube 7 may also be positioned at its lowest position for more compactness as required for shipping purposes.

In other embodiments of the present invention legs 5 may be lengthwise collapsible, as the legs of a camera tripod are, in order to attain a more compact product for shipping.

What is claimed is:

1. A projection apparatus comprising a light source attached to height adjustment means, said height adjustment means attached to a generally pyramidal shaped frame, a transparent, generally horizontal platform under said light source, said platform removably attached to said frame, a power source to power said light source, and a sheet of substantially opaque material covering all sides of said frame while leaving an access opening on one side of said frame.

2. The projection apparatus of claim 1 wherein said frame is constructed out of four slender beams.

3. The projection apparatus of claim 1 wherein said frame is constructed out of four slender beams pivotally attached to a hub.

4. The projection apparatus of claim 1 wherein said height adjustment means comprise a fixed vertical tube, a rod slidable within said tube, friction means between said rod and said tube whereby said friction is sufficient for supporting the weight of said rod and said light source.

5. The projection apparatus of claim 2 wherein said beams are lengthwise collapsible.

6. The projection apparatus of claim 2 wherein four generally horizontal arms are attached to and extend from each of said beams substantially towards the center of said pyramid, and said platform is attached to said arms.

7. The projection apparatus of claim 3 wherein said height adjustment means is attached to said hub.

8. A projection apparatus comprising a light source attached to height adjustment means, said height adjustment means attached to a hollow bottomless pyramid, a transparent, generally horizontal platform under said light source, said platform attached to said pyramid, a power source to power said light source, and said pyramid having an access opening in one of its walls.

9. The projection apparatus of claim 8 wherein the walls of said hollow pyramid are constructed out of corrugated board.

10. A projection apparatus comprising a generally pyramidal shaped frame constructed out of four slender beams pivotally attached to a hub at the apex of said pyramidal shape, height adjustment means attached to said hub, a light source attached to said height adjustment means, a transparent generally horizontal platform under said light source, said platform removably attached to said frame, a power source to power said light source, and a sheet of substantially opaque material covering all sides of said frame while leaving an access opening on one side of said frame.

11. The projection apparatus of claim 10 wherein said height adjustment means comprise a fixed vertical tube, a rod slidable within said tube, friction means between said rod and said tube whereby said friction is sufficient for supporting the weight of said rod and said light source.

12. The projection apparatus of claim 10 wherein four generally horizontal arms are attached to and extend from each of said beams substantially towards the center of said pyramid, and said platform is attached to said arms.

13. The projection apparatus of claim 11 wherein four generally horizontal arms are attached to and extend from each of said beams substantially towards the center of said pyramid, and said platform is attached to said arms.

* * * * *